(No Model.)
M. A. EISENHOUR.
CULTIVATOR TOOTH.
No. 369,508. Patented Sept. 6, 1887.
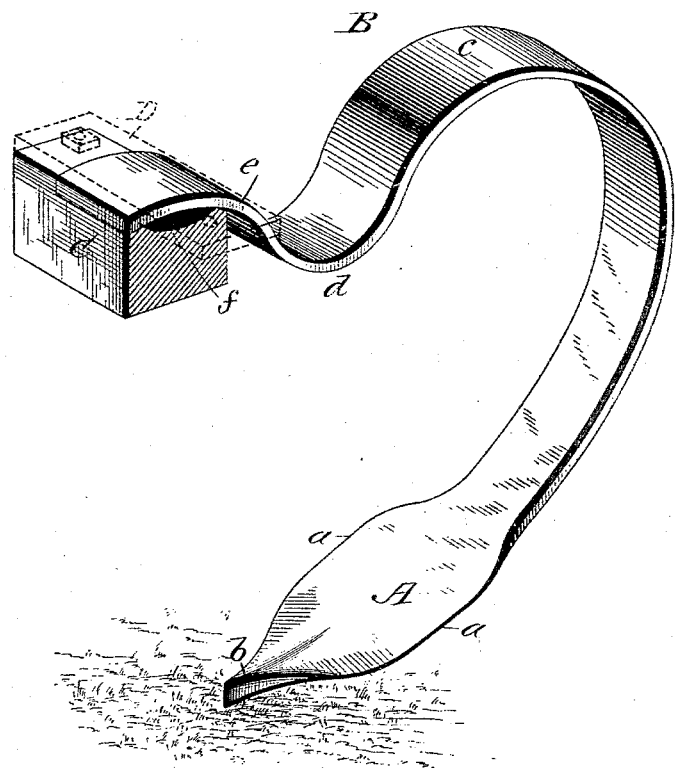
Witnesses
G. S. Elliott
L. L. Miller.
Inventor
Martin A. Eisenhour,
By his Attorney Chas. H. Fowler

UNITED STATES PATENT OFFICE.

MARTIN A. EISENHOUR, OF PLYMOUTH, INDIANA.

CULTIVATOR-TOOTH.

SPECIFICATION forming part of Letters Patent No. 369,508, dated September 6, 1887.

Application filed May 21, 1887. Serial No. 238,954. (No model.)

*To all whom it may concern:*

Be it known that I, MARTIN A. EISENHOUR, a citizen of the United States, residing at Plymouth, in the county of Marshall and State of Indiana, have invented certain new and useful Improvements in Cultivator-Teeth; and I do hereby declare that the following is a full, clear, and exact description of the same, reference being had to the annexed drawing, making a part of this specification, and to the letters and figures of reference marked thereon.

The object of the present invention is to provide a simple and effective spring-tooth for cultivators of such construction that by its adjustment on the tooth-bar or clip the tooth may be made to vibrate in a greater or less degree and plow the ground deep or shallow, as circumstances may require, or the tooth made rigid to adapt it to the plowing of hard ground, which objects I attain by the construction substantially as shown in the drawing and hereinafter described and claimed.

In the accompanying drawing I have shown a perspective view of a cultivator-tooth constructed in accordance with my invention, and showing its position with relation to the tooth-bar or clip to which it is attached or secured.

The lower portion of the tooth curves inwardly and is provided with a flat shovel-point, A, having cutting-edges $a$ at its sides, so that it will penetrate the ground much easier than the ordinary flat tooth. The extremity of the point A terminates in a chisel-edge, $b$, which is at right angles to the plane of the point, whereby the point is rendered more effective in tearing up the ground and much more lasting. The shank B of the tooth has three distinct curves, $c$ $d$ $e$, which curves give both strength and elasticity to the tooth, the two last-mentioned curves enabling the shank to be fastened to the tooth-bar or clip C in either one of two positions, and is held thereon by a cap-plate, D, (shown in dotted lines,) secured in place by suitable bolts and nuts. Any suitable cap-plate and fastening to hold the tooth in place may be employed, as I lay no claim thereto, the invention consisting solely in the construction of the tooth.

In the drawing I have shown the shank connected at its extremity to the tooth-bar or clip C. Now, when in this position, the vibrations of the tooth will be greater and it will plow the ground deeper, and when the shank is slipped forward so as to bring the curve $e$ upon the tooth-bar or clip and is secured thereto, the vibrations of the tooth will be less, and consequently the tooth will plow shallower. When the shank is moved still farther forward, so as to bring the curve $d$ upon the concave seat $f$ and securely held thereon, the shank will be connected at its lowest point to the clip or tooth-bar, and therefore the tooth will become rigid and stand nearly upright, in which position it is intended for plowing hard ground.

As will be seen, the construction of the tooth enables it to be adjusted on the tooth-bar or clip so as to adapt it to hard or soft ground, giving it greater or less vibration or making it rigid, as circumstances require.

Having now fully described my invention, what I claim as new, and desire to secure by Letters Patent, is—

The cultivator-tooth herein described, terminating at its lower end in a flat shovel-point, A, having cutting-edges $a$ and chisel-edge $b$, and having its shank bent to form three distinct curves, $c$ $d$ $e$, substantially as and for the purpose set forth.

In testimony that I claim the above I have hereunto subscribed my name in the presence of two witnesses.

MARTIN A. EISENHOUR.

Witnesses:
SAMUEL PARKER,
JOHN N. WILSON.